(12) United States Patent
Jung et al.

(10) Patent No.: US 12,298,650 B2
(45) Date of Patent: May 13, 2025

(54) METHOD OF MEASURING ELECTRO-OPTIC CHARACTERISTIC OF A TRAVELING WAVE MACH-ZEHNDER MODULATOR AND DEVICE FOR SAME

(71) Applicant: Taiwan Semiconductor Manufacturing Company, Hsinchu (TW)

(72) Inventors: Ming Yang Jung, Kaohsiung (TW); Lan-Chou Cho, Hsinchu (TW); Stefan Rusu, Sunnyvale, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 266 days.

(21) Appl. No.: 17/835,414

(22) Filed: Jun. 8, 2022

(65) Prior Publication Data

US 2023/0400745 A1  Dec. 14, 2023

(51) Int. Cl.
*G02F 1/225* (2006.01)
*G01B 9/02055* (2022.01)
(Continued)

(52) U.S. Cl.
CPC ......... *G02F 1/2255* (2013.01); *G01B 9/0207* (2013.01); *G02B 6/12004* (2013.01);
(Continued)

(58) Field of Classification Search
CPC ..... G02F 1/212; G02F 1/0121; G01B 9/0207; G01B 2290/60
See application file for complete search history.

(56) References Cited

U.S. PATENT DOCUMENTS 11,837,509 B1 * 12/2023 Chou ................ H01L 31/02325
2004/0028418 A1   2/2004 Kaplan et al.
(Continued)

FOREIGN PATENT DOCUMENTS

CN   114365034 A   4/2022
CN   114415400 A   4/2022

OTHER PUBLICATIONS

Ding et al., Sub-Volt Silicon-Organic Electro-optic Modulator With 500MHz Bandwidth, Journal of Lightwave Technology, 2011, vol. 28, Issue 8, pp. 1115-1116. (Year: 2011).*

(Continued)

*Primary Examiner* — Marin Pichler
*Assistant Examiner* — Kirsten D. Endresen
(74) *Attorney, Agent, or Firm* — Lippes Mathias LLP

(57) ABSTRACT

A method of characterizing a traveling-wave Mach-Zehnder modulator (TWMZM) includes measuring an electrooptic parameter, such as S21, of a test structure including a test TWMZM and a first instance of electrical pads which are connected to deliver a radio frequency (RF) signal to electrooptically modulate light traveling through the test TWMZM. The electrooptic parameter is similarly measured of a reference structure including a reference TWMZM and a second instance of the electrical pads which are connected to deliver the RF signal to electrooptically modulate light traveling through the reference TWMZM. A vestigial traveling-wave electrooptic phase modulator of the reference TWMZM is shorter than a traveling-wave electrooptic phase modulator of the test TWMZM. An electrooptic characteristic of the test TWMZM, such as S21 bandwidth, is determined by operations including subtracting the measured electrooptic S21 of the reference structure from the measured electrooptic S21 of the test structure.

20 Claims, 7 Drawing Sheets

(51) Int. Cl.
*G02B 6/12* (2006.01)
*G02F 1/01* (2006.01)
*G02F 1/21* (2006.01)

(52) U.S. Cl.
CPC ............ *G02F 1/0121* (2013.01); *G02F 1/212* (2021.01); *G01B 2290/60* (2013.01); *G02B 2006/12061* (2013.01); *G02B 2006/12142* (2013.01); *G02B 2006/1215* (2013.01)

(56) References Cited

U.S. PATENT DOCUMENTS

| | | | | |
|---|---|---|---|---|
| 2009/0297088 | A1* | 12/2009 | Koh | G02F 1/0356 385/2 |
| 2010/0254420 | A1* | 10/2010 | Corzine | H04B 10/506 372/50.122 |
| 2013/0011093 | A1* | 1/2013 | Goh | H04B 10/5162 385/2 |
| 2017/0194308 | A1 | 7/2017 | Evans et al. | |
| 2018/0102847 | A1 | 4/2018 | Kim et al. | |
| 2019/0146304 | A1* | 5/2019 | Yu | G02F 1/2257 385/2 |
| 2021/0232016 | A1* | 7/2021 | Ogiso | G02B 6/12 |
| 2021/0240049 | A1 | 8/2021 | Abe et al. | |
| 2021/0373410 | A1* | 12/2021 | Zhou | G02F 1/218 |

OTHER PUBLICATIONS

Ran Ding et al., "High-Speed Silicon Modulator with Slow-Wave Electrodes and Fully Independent Differential Drive", Journal of Lightwave Technology, vol. 32, No. 12, Jun. 15, 2014, Published by ResearchGate.net online.

* cited by examiner

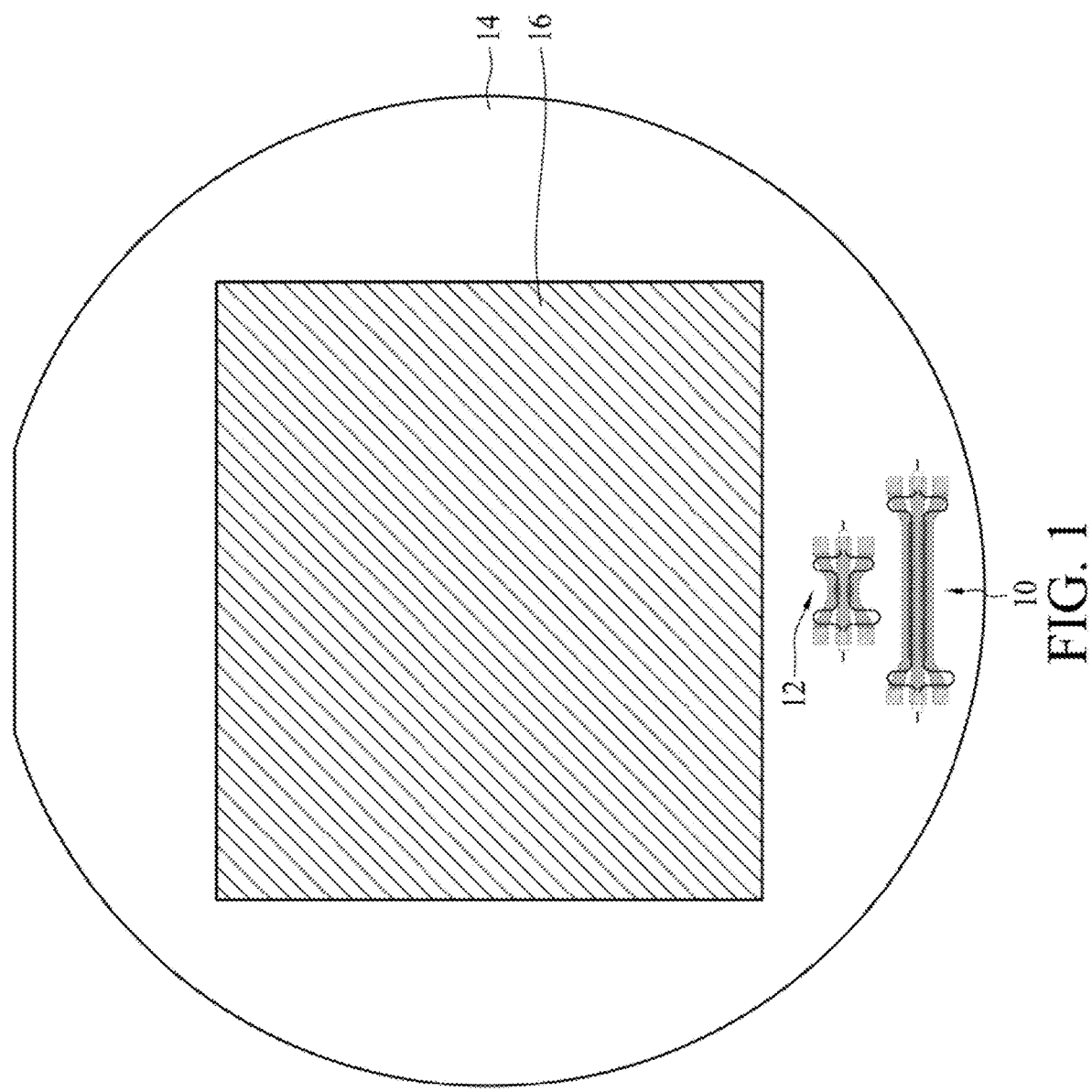

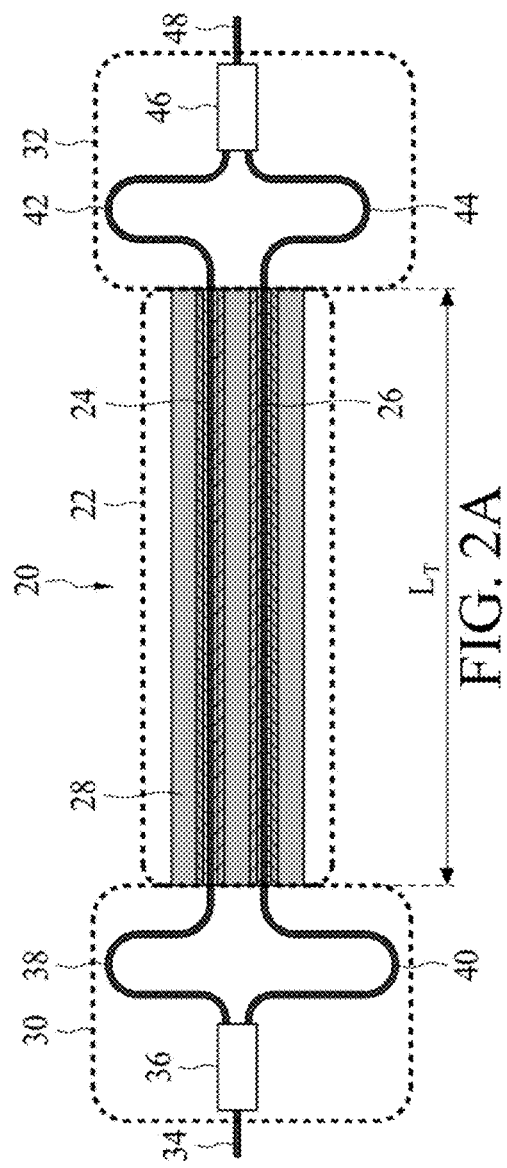
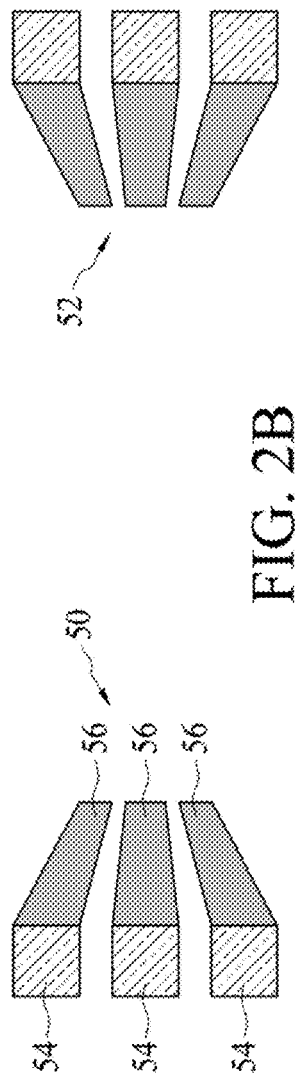
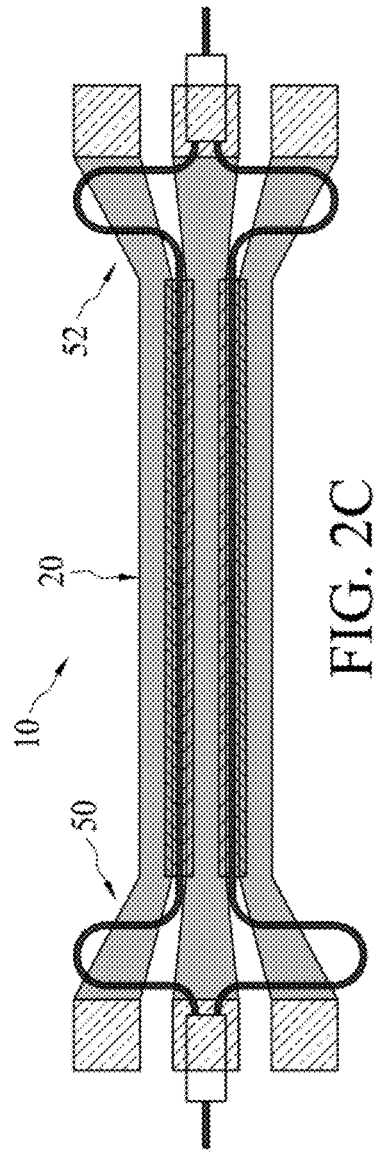
FIG. 2A
FIG. 2B
FIG. 2C

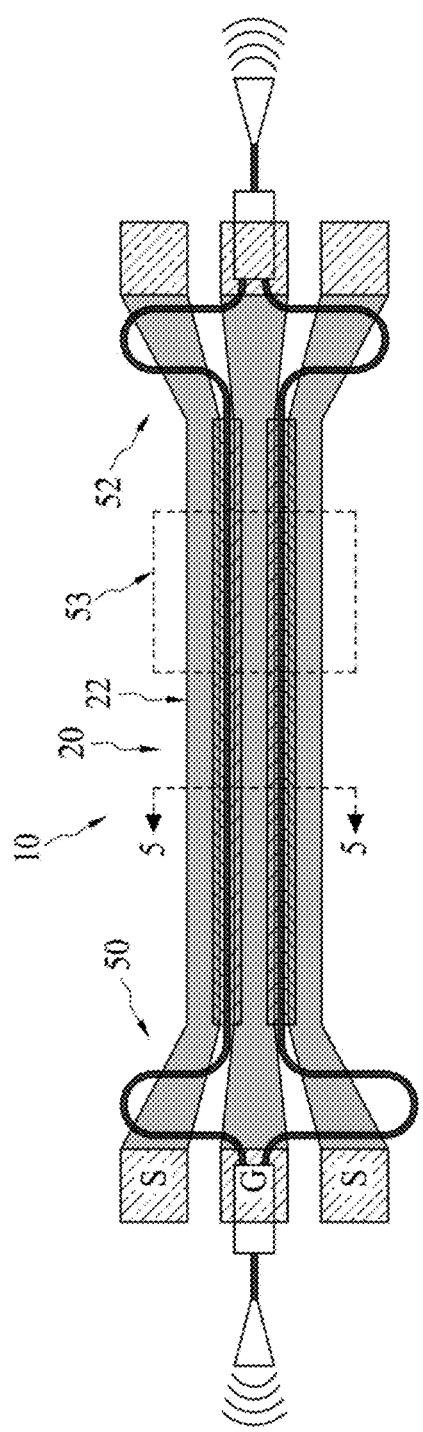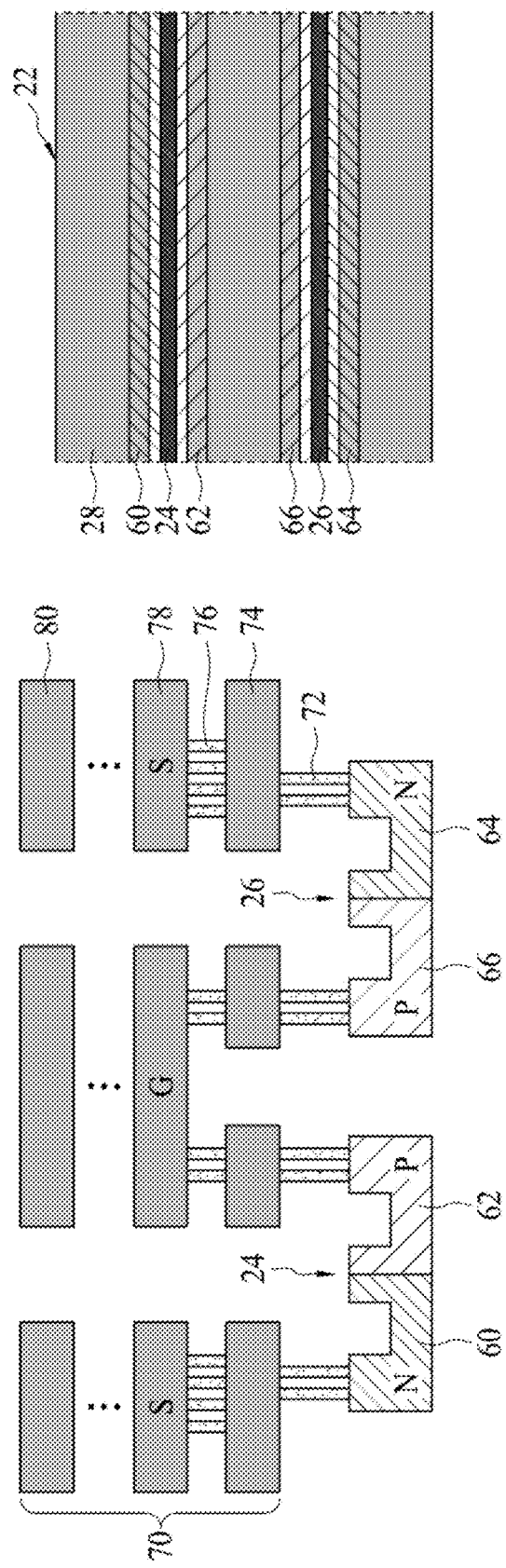
FIG. 3A
FIG. 3B
FIG. 3C

TWMZM with RF pad and tapered structure of transmission line

TWMZM reference

TWMZM without RF pad and tapered structure of transmission line

METHOD OF MEASURING ELECTRO-OPTIC CHARACTERISTIC OF A TRAVELING WAVE MACH-ZEHNDER MODULATOR AND DEVICE FOR SAME

BACKGROUND

The following relates to the photonics arts, electrooptical device arts, and related arts.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 diagrammatically illustrates a wafer including a photonic integrated circuit (PIC) and a test structure and reference structure used as disclosed herein for characterizing a test traveling-wave Mach-Zehnder modulator (TWMZM).

FIGS. 2A, 2B, and 2C diagrammatically illustrate top views of: a TWMZM shown in isolation (FIG. 2A); electrical pads shown in isolation (FIG. 2B); and a test structure shown in FIG. 2C including the TWMZM of FIG. 2A and the electrical pads of FIG. 2B connected to drive a radio frequency (RF) transmission line of the TWMZM.

FIG. 3A diagrammatically illustrates the top view of the test structure of FIG. 2C. FIG. 3B diagrammatically illustrates, a side sectional view of the phase modulator of the TWMZM of the test structure. FIG. 3C diagrammatically illustrates a top view of an enlarged portion of the phase modulator.

DETAILED DESCRIPTION

Figure 4A:
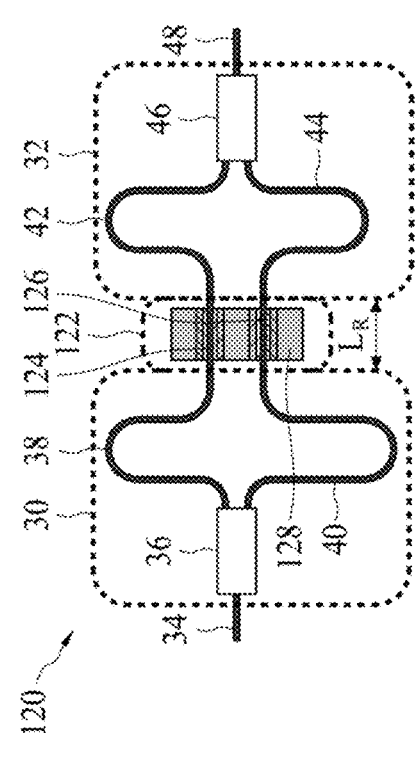
FIGS. 4A, 4B, and 4C diagrammatically illustrate top views of: a reference TWMZM with a vestigial traveling-wave phase modulator shown in isolation (FIG. 4A); electrical pads shown in isolation (FIG. 4B); and a reference structure shown in FIG. 4C including the reference TWMZM of FIG. 4A and the electrical pads of FIG. 4B connected to drive a RF transmission line of the reference TWMZM.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Mach-Zehnder modulators employ an optical splitter that splits light into first and second optical paths of a dual-path phase modulator with electrooptically tunable optical path length difference, followed by an optical combiner. Such a device provides for electrooptic modulation of the light output from the combiner due to constructive or destructive interference of the light in the two optical paths depending on an electrooptically tuned optical path length difference. A phase difference of the light in the two paths of π radians (or an odd multiple thereof, e.g. 3π radians, 5π radians, et cetera) produces destructive optical interference so that the light output is minimum or zero, while the in-phase condition (i.e., phase difference of 0 radians or 2π radians or 4π radians, et cetera) produces constructive optical interference so that the light output is maximum. Hence, a Mach-Zehnder modulator can modulate light in an "on" versus "off" manner (or in other modes, e.g. having three or more discrete outputs, or having an analog output). Mach-Zehnder modulators are popular devices in silicon photonic devices and photonic integrated circuit (PIC) devices for achieving high data rates because of the large bandwidth of such devices.

A Traveling-Wave Mach-Zehnder modulator (TWMZM) is a Mach-Zehnder modulator in which the first and second optical paths are constructed as first and second optical waveguides, and the electrooptic modulation is implemented by way of a radio frequency (RF) transmission line electrically coupled with the first and second optical waveguides. The phase difference of light in the two waveguides is thus induced in a distributed fashion, over the length of the dual-path phase modulator. In the TWMZM, the material of the optical waveguides is chosen to exhibit an electrooptic effect in which the refractive index of the material changes as a function of the applied electric field. To facilitate symmetric phase modulation, in some TWMZM designs an unbiased nonzero unmodulated phase difference is incorporated by way of the optical splitter (or, alternatively, the combiner) having a physical path length difference ΔL between first and second optical paths of the optical splitter that feed into the waveguides. In this case the total phase difference between the two paths is the sum of the phase difference produced by the path length difference ΔL and the electrooptically induced phase difference in the dual-path phase modulator. TWMZM devices are commonly used in commercial PIC chips or other photonic systems due to benefits such as their thermal insensitivity and tolerance to fabrication imperfections, among other benefits.

There are various situations in which it is desirable to measure one or more electrooptic characteristics of a TWMZM. For example, the insertion loss (often characterized as the electrooptic S21 network parameter) measures signal loss introduced by the TWMZM. Typically, the insertion loss or S21 value decreases with increasing radio frequency (RF) of the applied electrical modulation. The S21 bandwidth (for example, expressed as the S21 3 dB bandwidth) is a useful measure of the modulation speed attainable with a given TWMZM, with higher bandwidth enabling higher speed modulation of the optical signal using the TWMZM.

Disclosed herein are methods for characterizing a TWMZM, with specific examples of measuring S21 or another network parameter of the TWMZM and/or an S21 bandwidth characteristic such as the S21 3 dB bandwidth. The characterization methods disclosed herein recognize the potential for measurement of the TWMZM to be adversely affected by the impact of the electrical pads used to drive the electrooptic modulation of the TWMZM, and the disclosed methods overcome this difficulty, so as to enable the characteristic(s) of the TWMZM to be measured separated from those of electrical pads used to drive electrooptic modulation of the TWMZM.

With reference to FIG. 1, a test device includes a test structure 10 including a test TWMZM and a reference structure 12 including a reference TWMZM, both fabricated on a single wafer 14. In some illustrative embodiments, the wafer 14 is a silicon wafer or a silicon-on-insulator (SOI) wafer, and the TWMZM of the test structure 10 and of the reference structure 12 are silicon-based devices. However, more generally the TWMZM may comprise other materials, such as being group III-V materials (GaAs, InP, et cetera) fabricated on a group III-V substrate wafer. For use in quality control tasks, the test structure 10 and reference structure 12 may be fabricated on the same wafer as a diagrammatically indicated photonic integrated circuit (PIC) 16 or other photonic device. In such a case, the test structure 10 and reference structure 12 may be fabricated using the same process steps that are used to fabricate one or more TWMZM components of the PIC 16. In this way, characteristic(s) of the TWMZM components of the PIC 16 can be reasonably inferred from measurements acquired from the concurrently fabricated test structure 10 and reference structure 12. While a single instance is shown in FIG. 1 of the illustrative test structure 10 and reference structure 12 located in a peripheral region of the wafer 14 outside the area of the PIC 16, multiple instances of the test structure 10 and reference structure 12 can be distributed around the periphery of the PIC 16, and/or may be disposed inside the area of the PIC 16 in areas not occupied by devices of the PIC, to provide quality control testing at different locations across the wafer 14.

For other tasks, such as TWMZM design, the test structure 10 and reference structure 12 may be fabricated on the wafer without the additional formation of the PIC 16 or another photonic device on the wafer. For example, manufacturing runs may be performed to form the test structure 10 and reference structure 12 on a plurality of wafers using different fabrication parameters (temperature, material deposition parameters, etch parameters, and/or so forth) for fabricating the TWMZM's, with the test structure 10 and reference structure 12 formed on each such wafer being characterized as described herein to empirically optimize the TWMZM fabrication. These are merely nonlimiting illustrative tasks or applications of the test structure 10 and reference structure 12.

With reference to FIGS. 2A, 2B, and 2C, an illustrative embodiment of the test structure 10 is shown in diagrammatic top view. The test structure 10 includes a test TWMZM 20 shown in isolation in FIG. 2A, electrical pads 50, 52 shown in isolation in FIG. 2B, and the test structure 10 shown in FIG. 2C which combines the TWMZM 20 of FIG. 2A and the electrical pads 50, 52 of FIG. 2B connected to drive electrooptic modulation of the TWMZM 20.

With particular reference to FIG. 2A, the test TWMZM 20 includes a dual-path phase modulator 22 with first and second optical waveguides 24, 26 forming the two optical paths, and a radio frequency (RF) transmission line 28 electrically coupled with the first and second optical waveguides 24 and 26. The RF transmission line 28 can be energized via the electrical pads 50, 52 to provide differential electrooptic phase modulation of the optical signals traveling through the two optical waveguides 24 and 26. A length $L_T$ of the phase modulator 22 (i.e., a length $L_T$ of the optical waveguides 24 and 26) is suitably chosen based on the design of the TWMZM components of the PIC 16 (see FIG. 1) or based on the TWMZM design being developed, including factors such as the free-space wavelength of the light to be modulated, optical power of the light to be modulated, the refractive index (including electrooptical modulation thereof) of the core material of the waveguides 24 and 26 at the design-basis optical wavelength, space constraints imposed by the design of the PIC, and/or so forth. In some nonlimiting illustrative examples, the length $L_T$ may be in a range of 0.1 mm to 3 mm, although other values are also contemplated. As further examples, the design-basis free-space wavelength of the light to be modulated may (by way of nonlimiting illustrative example) be in the O-band (1260 nm to 1360 nm), the C-band (1500 nm to 1600 nm), or may be another wavelength in the infrared, visible, or ultraviolet wavelength ranges.

The TWMZM 20 further includes a first instance of an optical splitter 30, which is optically coupled to input light to first ends of the first and second optical waveguides 24 and 26; and a first instance of an optical combiner 32 optically coupled to combine light from second ends of the first and second optical waveguides 24 and 26. More particularly, the optical splitter 30 includes an optical input port 34 and a beam splitting element 36 that splits the light input at the input port 34 into a first leg 38 which is an optical path that feeds the light into the first optical waveguide 24, and a second leg 40 which is an optical path that feeds the light into the second optical waveguide 26. At the opposite end of the phase modulator 22, the optical combiner 32 includes a first leg 42 connected with the first optical waveguide 24 and a second leg 44 connected with the second optical waveguide 26. The first leg 42 is an optical path that feeds the light output by the first optical waveguide 24 into an optical combiner element 46; and similarly the second leg 44 is an optical path that feeds the light output by the second optical waveguide 26 into the optical combiner element 46. The combined light is output at an output optical port 48. In one nonlimiting illustrative embodiment, the optical splitter 30 and the optical combiner 32 comprise one-dimensional grating coupler (1DGC) elements, with the beam splitting element 36 and optical combiner element 46 being multi-mode interferometer (MMI) optical power splitter/combiner elements. This is merely an illustrative example.

In the illustrative embodiment, the two legs 38 and 40 of the optical splitter have different path lengths introducing a path length difference ΔL that produces a designed phase difference $\Delta\phi_{in}$ in the light input to the respective first and second optical waveguides 24 and 26. Such a path length difference ΔL is optional, but if included may facilitate enabling symmetric modulation of the optical on/off states. The total phase difference Δϕ introduced between the phases of the light in the two respective waveguides 24 and 26 is then Δϕ=Δϕ$_{in}$+Δϕ$_{EO}$ where Δϕ$_{EO}$ is the phase difference that is electrooptically induced by a differential electrical bias applied to the two waveguides 24 and 26 via the RF transmission line 28.

Turning to FIGS. 2B and 2C, the electrical pads 50 and 52 are shown in isolation in FIG. 2B, and as shown in FIG. 2C are electrically connected with the RF transmission line 28 for applying an RF modulation signal to the RF transmission line 28 of the TWMZM 20 (and more particularly to the RF transmission line 28 of the phase modulator 22 of the TWMZM 20) to perform phase modulation of the light. The electrical pads 50 and 52 include contact pads 54 designed to be contacted with an electrical probe of a network analyzer or other electrical lead or probe delivering RF signal and ground potential, and tapered electrically conductive structures 56 for conducting these electrical signals or potentials to the transmission line 28. For example, the tapered electrically conductive structures 56 may be tapered conductive traces of copper or another suitable metal formed on the substrate wafer 14 (see FIG. 1). As seen in FIG. 2C, in the illustrative embodiment the electrical pad 50 and the optical splitter 30 overlap laterally, and the electrical pad 52 and the optical combiner 32 also overlap. However, this overlapping arrangement is not necessary.

With reference now to FIG. 3A, the test structure 10 including the TWMZM 20 and electrical pads 50 and 52 is further described. FIG. 3A diagrammatically illustrates the top view of the test structure of FIG. 2C, with indications of a Section S-S and a portion 53 of the phase modulator 22. FIG. 3B illustrates a diagrammatic cross-sectional representation of the dual-path phase modulator 22 taken along the Section S-S, and FIG. 3C illustrates a top view of the enlarged portion 53 of the phase modulator 22. As seen in FIG. 3B and FIG. 3C, in this illustrative embodiment the waveguide 24 is formed from material of an n-p diode made of contacting strips of n-type semiconductor material 60 and p-type semiconductor material 62. At the n/p junction between the n-type and p-type strips 60 and 62, the material forms a raised ridge which is the optical waveguide 24. Similarly, the waveguide 26 is formed from material of an n-p diode made of contacting strips of n-type semiconductor material 64 and p-type semiconductor material 66. At the n/p junction between the n-type and p-type strips 64 and 66, the material forms a raised ridge which is the optical waveguide 26. In some embodiments, the semiconductor material of the n-type and p-type strips 60, 62, 64, and 66 is silicon (so that the optical waveguides 24 and 26 are silicon waveguides. Although not shown, a lower refractive index cladding material is preferably disposed around the raised ridges forming the waveguides 24 and 26, such as a silicon dioxide (SiO$_2$) cladding layer in the case of silicon waveguides.

With continuing reference to FIG. 3B and FIG. 3C, the RF transmission line 28 comprises the n-p junction strips formed by the n-type and p-type strips 60, 62, 64, and 66. More particularly, the n-p junction strip formed by the contacting n-type strip 60 and p-type strip 62 forms an RF transmission line electrically coupled with the first optical waveguide 24, and more particularly the electric field generated in the silicon at the n/p junction between the strips 60 and 62 provides the electric field for generating an electrooptic shift in refractive index in the first optical waveguide 24. Similarly, the n-p junction strip formed by the contacting n-type strip 64 and p-type strip 66 forms an RF transmission line electrically coupled with the second optical waveguide 26, and more particularly the electric field generated in the silicon at the n/p junction between the strips 64 and 66 provides the electric field for generating an electrooptic shift in refractive index in the first optical waveguide 24. As particularly shown in FIG. 3B, back-end-of-line (BEOL) processing forming metallization layers 70 provides for electrically driving the RF transmission line 28 formed by the n-type and p-type strips 60, 62, 64. The illustrative metallization layers 70 include electrical vias 72 of cobalt or another electrically conductive metal connecting to a first metallization layer 72 (sometimes referred to as the MO metallization layer), and additional metallization layers 74, 76, . . . , 78 interconnected by intermetal vias 76. Although not shown, it is to be understood that there is an intermetal dielectric (IMD) disposed between the various vias 72, 76 and layers 74, 78, . . . , 80. In one nonlimiting illustrative example in which the semiconductor material of the n-type and p-type strips 60, 62, 64, and 66 is silicon, the IMD may be silicon dioxide (SiO$_2$) which also forms the cladding of the ridge waveguides 24 and 26.

In the specific illustrative embodiment of FIG. 3B, both p-type strips 62 and 66 are connected to electrical ground, while the n-type strips 60 and 64 are connected to a differential RF drive signal. (Note that because the both p-type strips 62 and 66 are grounded, they can optionally be merged to form a single p-type strip). As a nonlimiting illustrative example, a differential signal could be applied in which the voltage on n-type strip 60 is +1 volt and the voltage on n-type strip 64 is −0.5 volt. This produces +1 volt across the first optical waveguide 24, and −0.5 volt across the second optical waveguide 26, leading to different optical path lengths for the respective first and second optical waveguides 24 and 26. If the differential signal is then changed to 0 volt on the n-type strip 64, then this changes the optical path length for the second optical waveguide 26, leading to a change in the electrooptic phase difference ϕ$_{EO}$. Again, this is merely a nonlimiting illustrative example.

Figure 4B:
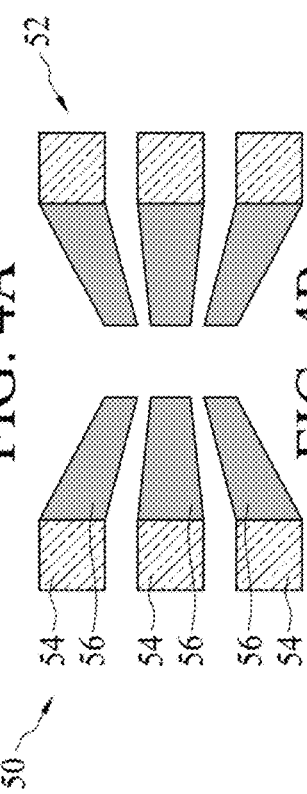
Figure 4C:
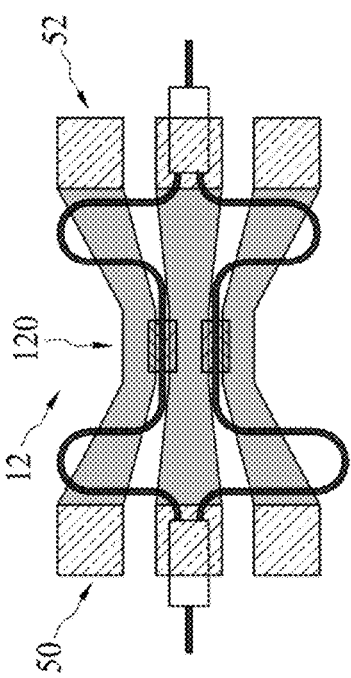

With reference now to FIGS. 4A, 4B, and 4C, the reference structure 12 is shown in diagrammatic top view. The reference structure 12 includes a reference TWMZM 120 shown in isolation in FIG. 4A, a second instance of electrical pads 50, 52 shown in isolation in FIG. 4B, and the reference structure 12 shown in FIG. 4C which combines the reference TWMZM 120 of FIG. 2A and the second instance electrical pads 50, 52 of FIG. 4B connected to drive electrooptic modulation of the TWMZM 20. With particular reference to FIG. 4A, the reference TWMZM 20 includes a dual-path vestigial phase modulator 122 with first and second optical waveguides 124, 126 forming the two optical paths, and a radio frequency (RF) transmission line 128 electrically coupled with the first and second optical waveguides 124 and 126. The RF transmission line 128 can be energized via the second instances of the electrical pads 50, 52 to provide differential electrooptic phase modulation of the optical signals traveling through the two optical waveguides 124 and 126. A length L$_R$ of the vestigial phase modulator 122 of the reference TWMZM 120 (i.e., a length L$_R$ of the optical waveguides 124 and 126) is shorter than the length L$_T$ of the phase modulator 22 of the test TWMZM 20. The vestigial phase modulator 122 thus is short, i.e. vestigial, as compared with the phase modulator 22 of the test TWMZM 20. In some embodiments, the length L$_R$ of the vestigial phase modulator 122 is 50 microns or less. As a consequence of the shortness of the vestigial phase modulator 122, its impact on the characteristics of the reference structure 12 is small.

Other than being shortened, the vestigial phase modulator 122 of the reference TWMZM 120 typically has the same structure as the phase modulator 22 of the test TWMZM 20. Hence, for example, the vestigial phase modulator 122 may have the same cross-section as is shown in FIG. 3B. Moreover, the remainder of the reference TWMZM 120 is also structurally the same as the test TWMZM 20. Hence, the reference TWMZM 120 further includes a second instance of the optical splitter 30 as shown in FIG. 4A, which is optically coupled to input light to first ends of the first and second optical waveguides 124 and 126; and a second instance of the optical combiner 32 optically coupled to combine light from second ends of the first and second optical waveguides 124 and 126. The second instance of the optical splitter 30 included in the reference TWMZM 120 is structurally the same as the first instance of the optical splitter included in the test TWMZM 20 (see FIG. 2A), and includes the optical input port 34, beam splitting element 36, first and second legs 38 and 40 feeding the respective first and second optical waveguides 124 and 126. At the opposite end of the vestigial phase modulator 122, the second instance of the optical combiner 32 includes the first leg 42 connected with the first optical waveguide 124 and the second leg 44 connected with the second optical waveguide 126, with the two legs 42 and 44 feeding the light into the optical combiner element 46 and the combined light being output at the output optical port 48.

As the second instance of the optical splitter 30 of the reference TWMZM 120 (FIG. 4A) is the same as the first instance of the optical splitter 30 of the test TWMZM 20 (FIG. 2A), the second instance also includes any path length difference $\Delta L$ included in the first instance of the optical splitter 30 to produce a designed phase difference $\Delta\phi_{in}$, as previously described with reference to FIG. 2A. For the reference TWMZM 120, the total phase difference $\Delta\phi$ between the phase of the light exiting the first optical waveguide 24 and the phase of the light exiting the second optical waveguide 26 is then $\Delta\phi=\Delta\phi_{in}+\Delta\phi_{EO,vestigial}$ where $\Delta\phi_{EO,vestigial}$ is the phase difference electrooptically induced by a differential electrical bias applied to the two waveguides 124 and 126 via the RF transmission line 128.

FIG. 4B shows the second instance of the electrical pads 50 and 52, while FIG. 4C shows the second instance of the electrical pads 50 and 52 electrically connected with the RF transmission line 28 to form the complete reference structure 12. The second instance of the electrical pads 50 and 52 employed in the reference structure 12 (FIG. 4B) are the same as the first instance of the electrical pads 50 and 52 employed in the test structure 10 (FIG. 2B). Hence, the second instance of the electrical pads 50 and 52 include the same contact pads 54 and the same tapered electrically conductive structures 56. For example, the contact pads 54 are of the same material and size in both first and second instances of the electrical pads 50 and 52, and the tapered electrically conductive structures 56 have the same length and taper angle in both first and second instances of the electrical pads 50 and 52, and so forth.

Figures 5, 6:
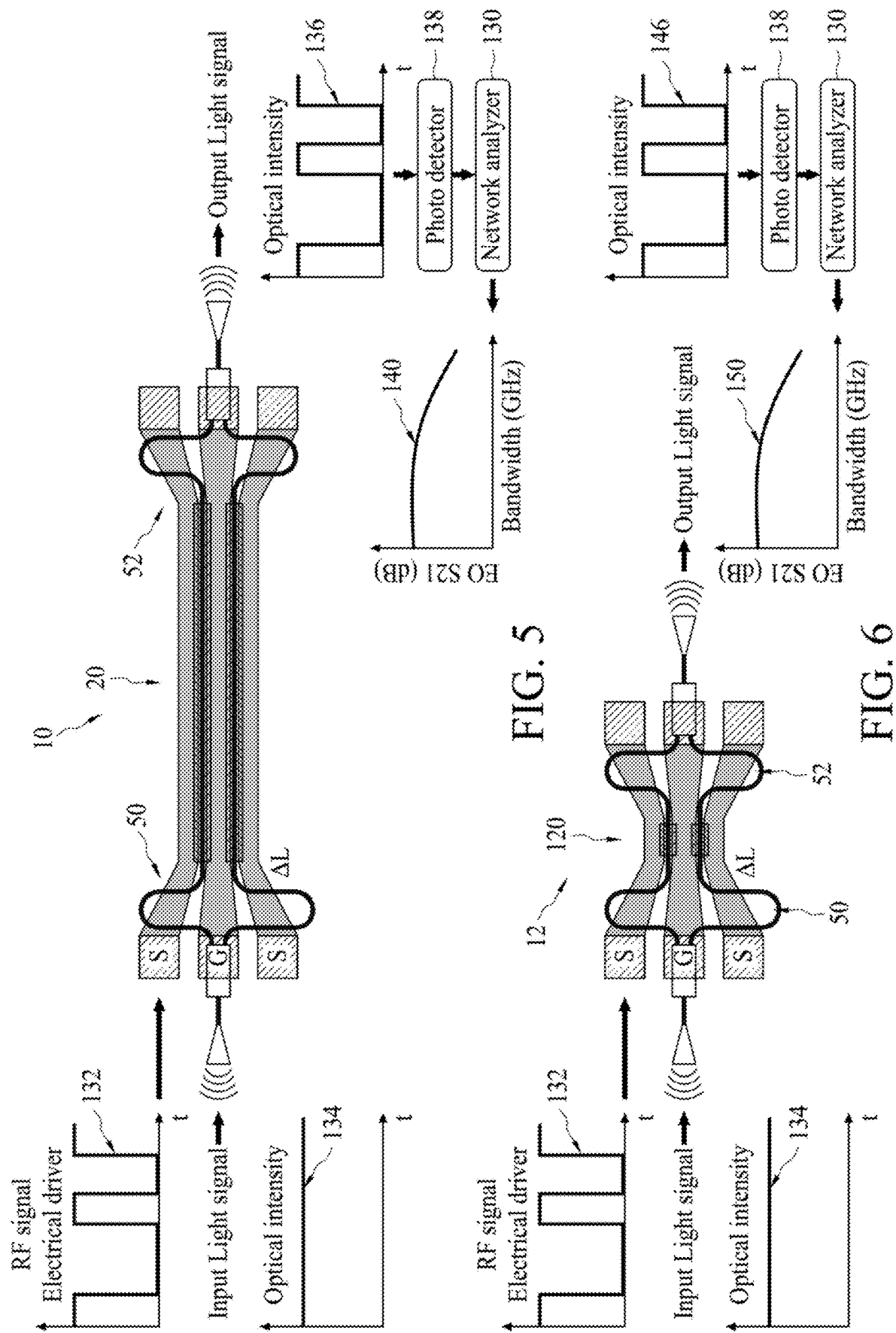
FIG. 5 diagrammatically illustrates a method of measuring an electrooptic characteristic of the test structure of FIGS. 2C and 3.
FIG. 6 diagrammatically illustrates a method of measuring an electrooptic characteristic of the reference structure of FIG. 4C.

With reference now to FIG. 5, a method is diagrammatically illustrated of measuring an electrooptic characteristic of the test structure of FIGS. 2C and 3 using a network analyzer 130. A light source (not shown) couples input light 132 to the test TWMZM 20 of the test device 10 (and more particularly couples the input light into the optical input port 34 of the first instance of the optical splitter 30, see FIG. 2A and related discussion). Concurrently, an RF signal 132 is applied by the network analyzer 130 to the electrical pad 50 so as to energize the RF transmission line 28 of the test TWMZM 20. The connection of the RF signal-out line of the network analyzer 130 to the electrical pads 50 is typically by way of contacting probe tips of probes of a mechanical probe station or the like to the contact pads 54 of the electrical pad 50. The input light 130 is modified by the test device 10 as previously described so as to introduce a phase difference $\Delta\phi$ (including any phase difference $\Delta\phi_{in}$ due to any physical path length difference $\Delta L$ and the electrooptic phase difference $\Delta\phi_{EO}$ induced in the phase modulator 22 by the applied RF signal 132) between the light output from the two optical waveguides 24 and 26, which when combined by the optical combiner 32 produces output light 136 that is modulated by the electrooptically modulated constructive/destructive optical interference in accordance with the RF signal 132. A photodetector 138 is optically coupled with the output of the test TWMZM 20 (and more particularly with the output optical port 48 of the first instance of the optical combiner 32, see FIG. 2A and related discussion) to convert the output light 136 to a corresponding electrical signal that is input to the network analyzer 130. The network analyzer then computes the electrooptic S21 network parameter of the test device 10 using the output of the photodetector 138 and the input RF signal 132. The network analyzer 130 sweeps the frequency of the input RF signal 132 in order to measure electrooptic S21 of the test device 10 as a function of frequency, thus generating an S21 spectrum 140 for the test device 10.

The electrooptic S21 as a function of frequency 140 is characteristic of the test device 10, and includes a primary contribution from the test TWMZM 20. However, the electrooptic S21 as a function of frequency 140 also includes a contribution from the electrical pads 50 and 52. This may be undesirable. For example, consider a quality control task for assessing QC of TWMZM components of the PIC 16 of FIG. 1. As noted, in the measurement of the test structure 10 depicted in FIG. 5, the RF signal is typically applied by contacting probe tips to the contact pads 54 of the electrical pad 50. On the other hand, the TWMZM components of the PIC 16 are generally not driven via such electrical pads, but rather by internal circuit traces of the PIC 16. Hence, the contribution of the electrical pads 50 and 52 means that the measured S21 spectrum 140 does not accurately represent the S21 spectrum of the test TWMZM 20 itself, and hence also does not represent the concurrently fabricated TWMZM components of the PIC 16.

In the case of using the S21 spectrum 140 as input to a TWMZM design process, the contribution of the electrical pads 50 and 52 to the measured S21 spectrum 140 complicates the extraction of the S21 spectrum of the TWMZM 20 alone from this data. While the TWMZM S21 spectrum alone might be extracted by modeling the effect of the electrical pads 50 and 52, this complicates the analysis and introduces some level of error.

To address these problems, the reference structure 12 is separately measured, and this information is used to remove the contribution of the electrical pads 50 and 52 from the measured S21 spectrum 140 so as to obtain a more accurate S21 spectrum for the test TWMZM 20 by itself.

FIG. 6 diagrammatically illustrates a method of measuring an electrooptic characteristic of the reference structure 12 of FIG. 4C using the network analyzer 130 in the same way as the measurement performed on the test structure 10 as previously described with reference to FIG. 5. The input light 132 is coupled to the reference TWMZM 120 of the reference device 12 (and again more particularly into the optical input port 34). Concurrently, the RF signal 132 is applied by the network analyzer 130 to (the second instance of) the electrical pad 50 so as to energize the vestigial RF transmission line 128 of the reference TWMZM 120 (see FIG. 4A). The connection of the RF signal-out line of the network analyzer 130 to the electrical pads 50 is again by way of contacting probe tips of probes of a mechanical probe station or the like. The input light 130 is modified by the reference device 12 as previously described so as to introduce a phase difference $\Delta\phi$ (including any phase difference $\Delta\phi_{in}$ introduced by a physical path length difference $\Delta L$ and the electrooptic phase difference $\Delta\phi_{EO,vestigial}$ induced in the vestigial phase modulator 122 by the applied RF signal 132) between the light output from the two optical waveguides 124 and 126, which when combined by (the second instance of) the optical combiner 32 produces output light 146 that is modulated by the electrooptically modulated constructive/destructive optical interference in accordance with the RF signal 132. The photodetector 138 is optically coupled with the output of the reference TWMZM 120 (and more particularly with the output optical port 48) to convert the output light 146 to a corresponding electrical signal that is input to the network analyzer 130. The network analyzer then computes the electrooptic S21 network parameter of the reference device 12 using the output of the photodetector 138 and the input RF signal 132. The network analyzer 130 sweeps the frequency of the input RF signal 132 in order to measure electrooptic S21 of the reference device 12 as a function of frequency, thus generating an S21 spectrum 150 for the reference device 12.

Figure 7A:
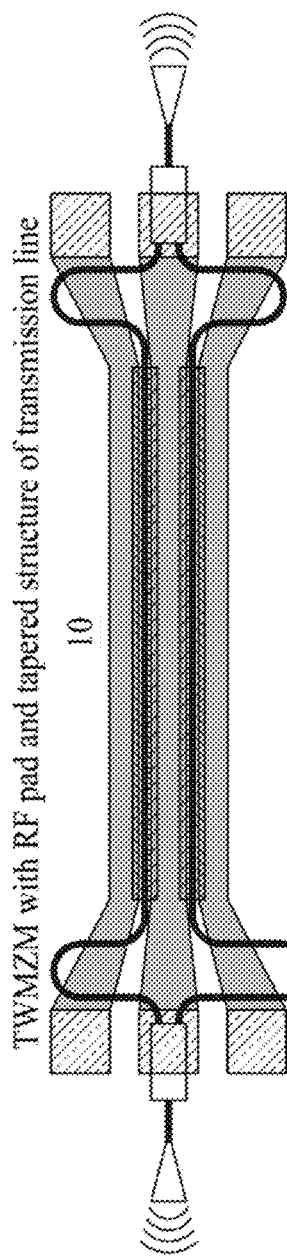
FIGS. 7A, 7B, 7C, and 7D diagrammatically illustrates use of the test and reference structures to determine an electrooptic characteristic of the test TWMZM of the test structure.
Figure 7B:
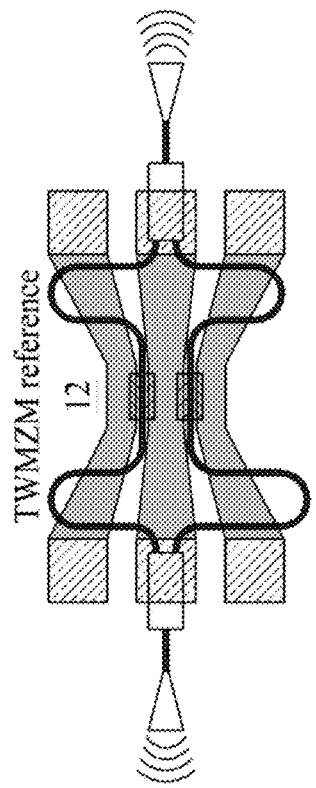
Figure 7C:
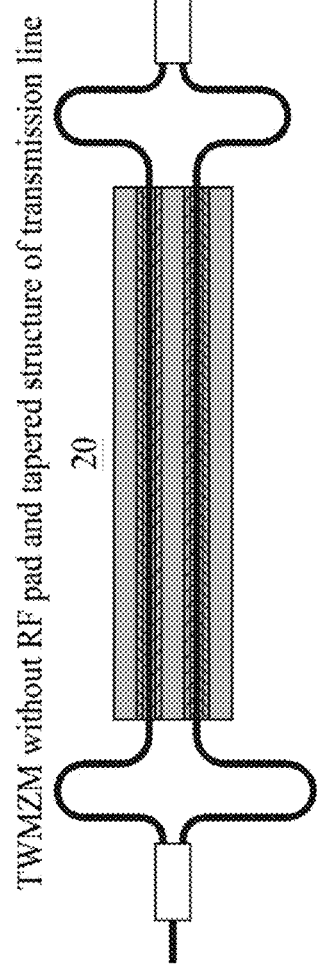

With reference now to FIGS. 7A, 7B, and 7C, use of the test and reference structures 10 and 12 to determine an electrooptic characteristic of the test TWMZM 20 of the test structure 10 is diagrammatically shown. As shown in FIG. 7A, measurement of the test structure 10 in accordance with FIG. 5 produces the S21 spectrum 140 of the test structure 10 shown in FIG. 7D. This S21 spectrum 140 includes the effect of the TWMZM 20 and the electrical pads 50 and 52 (including the contact pads 54 and the tapered electrically conductive structures 56). As shown in FIG. 7B, measurement of the reference structure 12 in accordance with FIG. 6 produces the S21 spectrum 150 of the reference structure 12 shown in FIG. 7D. Due to the vestigial phase modulator 122 being of short length $L_R$ (e.g., $L_R$=50 microns or less in some illustrative embodiments), its impact on the S21 spectrum 150 of the reference structure 12 is negligible, and it is expected that the S21 spectrum 150 of the reference structure 12 primarily represents the S21 network parameter of the electrical pads 50 and 52 (again, including the contact pads 54 and the tapered electrically conductive structures 56).

Figure 7D:
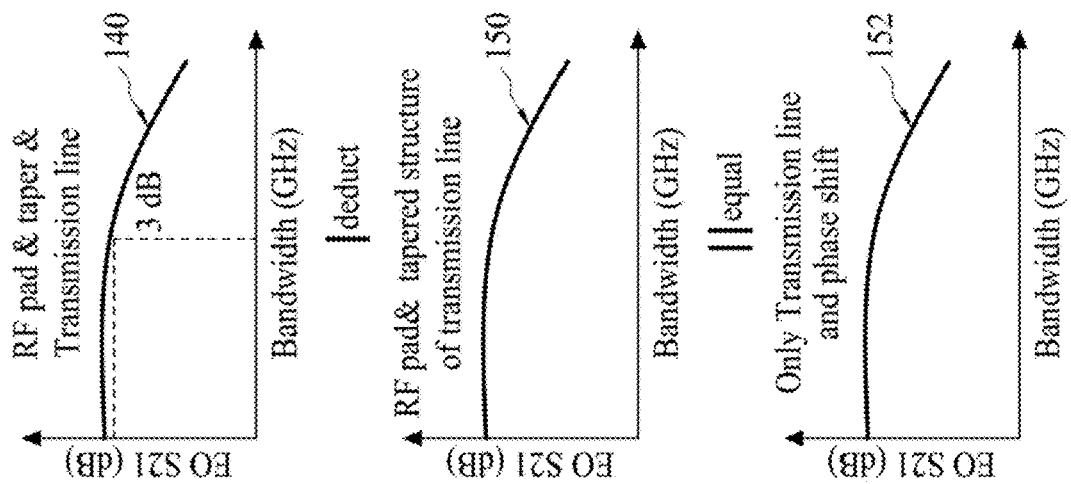

Hence, by subtracting the S21 spectrum 150 of the reference structure 12 from the S21 spectrum 140 of the test structure 10, an S21 spectrum 152 shown in FIG. 7D is determined which is representative of the test TWMZM 20 of the test structure 10 without the contribution of the electrical pads 50, 52, as shown in FIG. 7C. In a quality control task, this S21 spectrum 152 of the TWMZM 20 alone is expected to be more closely representative of TWMZM components of the PIC 16 of FIG. 1. In a TWMZM design task, the S21 spectrum 152 of the TWMZM 20 alone simplifies modeling and optimization of the TWMZM design.

Figure 8:
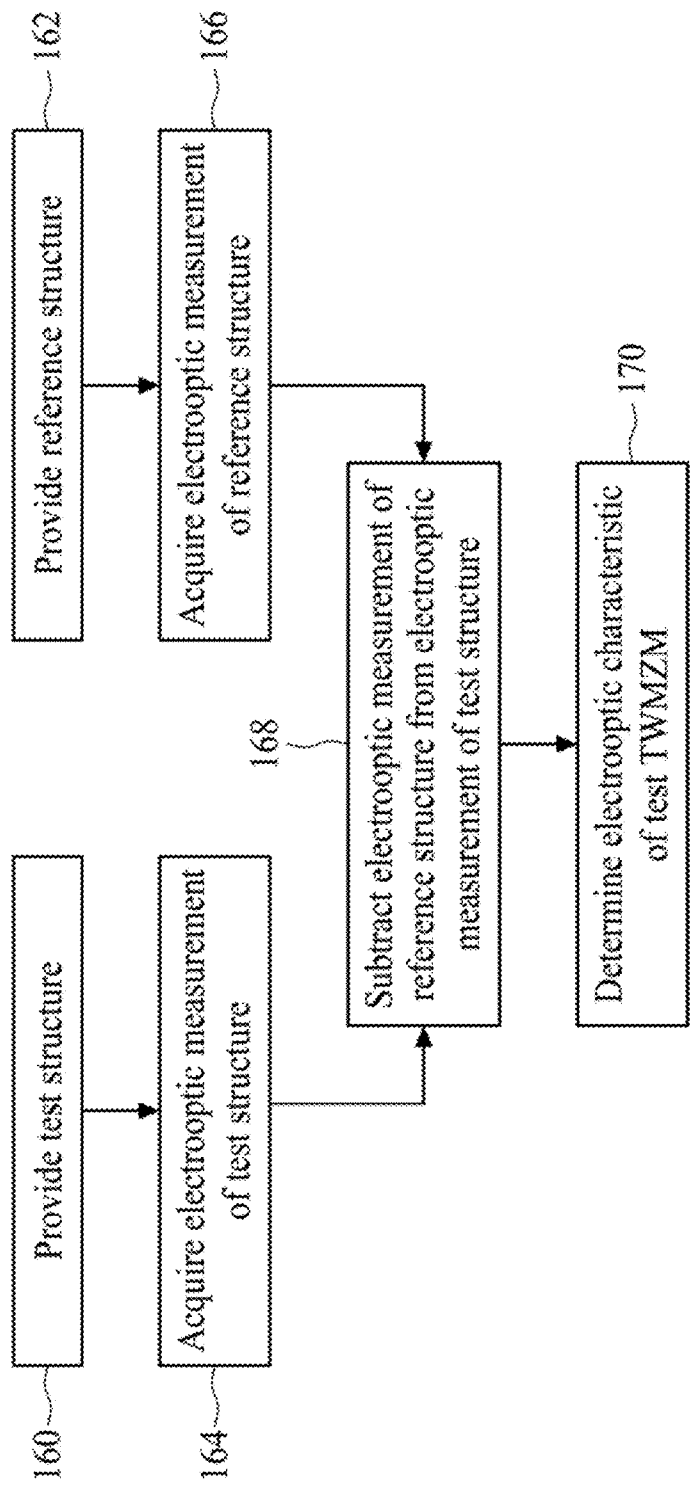
FIG. 8 diagrammatically illustrates a method of characterizing a TWMZM.

With reference to FIG. 8, a method of characterizing a TWMZM is described. In an operation 160 the test structure 10 (e.g., as shown in FIGS. 2C and 3) is provided, and in an operation 162 the reference structure 12 (e.g., as shown in FIG. 4C) is provided. As previously discussed, in some embodiments the operations 160 and 162 may be performed concurrently, and for quality control tasks the operations 160 and 162 may be performed as part of the manufacture of the PIC 16 of FIG. 1 in a case where the electrooptic measurement is a measurement of the electrooptic S21 network parameter.

In an operation 164, an electrooptic parameter of the test structure 10 is measured. This may, for example, be done as previously described with reference to FIG. 5 in a case where the electrooptic parameter is S21. The operation 164 may be performed as a function of RF frequency to obtain a spectrum of the electrooptic parameter for the test structure 10 as a function of RF frequency. In an operation 166, an electrooptic parameter of the reference structure 12 is measured. This may, for example, be done as previously described with reference to FIG. 6 in a case where the electrooptic parameter is S21. The operation 166 may be performed as a function of RF frequency to obtain a spectrum of the electrooptic parameter for the reference structure 12 as a function of RF frequency.

In an operation 168, the electrooptic parameter of the reference structure 12 measured in the operation 166 is subtracted from the electrooptic parameter of the test structure 10 measured in the operation 164. The operation 168 may, for example, be performed as diagrammatically shown in FIGS. 7A, 7B, 7C, and 7D in a case where the electrooptic parameter is an S21 spectrum. In embodiments in which the electrooptic parameter is measured in operations 164 and 166 as a function of RF frequency, the subtraction is suitably performed at each measured RF frequency, e.g. the S21 spectrum of the reference structure 12 is subtracted from the S21 spectrum of the test structure 10.

In some embodiments and for some applications, the method may stop at operation 168, yielding the electrooptic parameter, typically as a function of RF frequency, for the test TWMZM 20. However, in some embodiment this data is further processed to obtain a desired electrooptic characteristic of the TWMZM 20. For example, the 3 dB bandwidth can be computed in the operation 168 as the frequency where the value of electrooptic S21 for the TWMZM 20 drops by 3 dB from its maximum value. (The maximum S2 usually is measured for the lowest measured frequency). As previously mentioned, the 3 dB bandwidth of S21 is a useful characteristic for assessing the maximum achievable switching speed of the test TWMZM 20.

While the illustrative embodiments have been directed to S21 assessment, more generally other types of electrooptic parameter can be similarly measured. For example, the measured electrooptic parameter could be S21, or S12, or a Y-parameter or other network parameter, or so forth. Similarly, while the illustrative embodiments have determined the TWMZM characteristic as the 3 dB bandwidth of S21, other TWMZM characteristics can be similarly determined, such as a 6 dB bandwidth or so forth.

In the following, some further embodiments are described.

In a nonlimiting illustrative embodiment, a method is disclosed of characterizing a traveling-wave Mach-Zehnder modulator (TWMZM). A test TWMZM is provided, including a phase modulator with first and second optical waveguides and a radio frequency (RF) transmission line electrically coupled with the first and second optical waveguides, a first instance of an optical splitter optically coupled to input light to first ends of the first and second optical waveguides, and a first instance of an optical combiner optically coupled to combine light from second ends of the first and second optical waveguides. A reference TWMZM is also provided, including a vestigial phase modulator that is shorter than the phase modulator of the test TWMZM with vestigial first and second optical waveguides and a vestigial RF transmission line electrically coupled with the vestigial first and second optical waveguides, a second instance of the optical splitter optically coupled to input light to first ends of the vestigial first and second optical waveguides, and a second instance of the optical combiner optically coupled to combine light from second ends of the vestigial first and second optical waveguides. An electrooptic measurement is acquired of a test structure including the test TWMZM and a first instance of electrical pads connected to drive the RF transmission line of the test TWMZM. An electrooptic measurement is acquired of a reference structure including the reference TWMZM and a second instance of the electrical pads connected to drive the vestigial RF transmission line of the reference TWMZM. An electrooptic characteristic of the test TWMZM is determined by operations including subtracting the electrooptic measurement of the reference structure from the electrooptic measurement of the test structure.

In a nonlimiting illustrative embodiment, a device is disclosed for characterizing a TWMZM. The device includes: a test TWMZM including a traveling-wave electrooptic phase modulator, a first instance of an optical splitter optically coupled to input light to the traveling-wave electrooptic phase modulator, and a first instance of an optical combiner optically coupled to combine light output from the traveling-wave electrooptic phase modulator; a reference TWMZM including a vestigial traveling-wave electrooptic phase modulator that is shorter than the traveling-wave electrooptic phase modulator of the test TWMZM and is of length 50 microns or less, a second instance of the optical splitter optically coupled to input light to the vestigial traveling-wave electrooptic phase modulator, and a second instance of the optical combiner optically coupled to combine light output from the vestigial traveling-wave electrooptic phase modulator; a first instance of electrical pads connected to electrooptically modulate light traveling through the traveling-wave electrooptic phase modulator; and a second instance of the electrical pads connected to electrooptically modulate light traveling through the vestigial traveling-wave electrooptic phase modulator.

In a nonlimiting illustrative embodiment, a method is disclosed of characterizing a TWMZM. The method includes: measuring electrooptic S21 of a test structure including a test TWMZM and a first instance of electrical pads which are connected to deliver an RF signal to electrooptically modulate light traveling through the test TWMZM; measuring electrooptic S21 of a reference structure including a reference TWMZM and a second instance of the electrical pads which are connected to deliver the RF signal to electrooptically modulate light traveling through the reference TWMZM, wherein a vestigial traveling-wave electrooptic phase modulator of the reference TWMZM is shorter than a traveling-wave electrooptic phase modulator of the test TWMZM; and determining an electrooptic characteristic of the test TWMZM by operations including subtracting the measured electrooptic S21 of the reference structure from the measured electrooptic S21 of the test structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of characterizing a traveling-wave Mach-Zehnder modulator (TWMZM), the method comprising:
    providing a test TWMZM including a phase modulator with first and second optical waveguides and a radio frequency (RF) transmission line electrically coupled with the first and second optical waveguides, a first instance of an optical splitter optically coupled to input light to first ends of the first and second optical waveguides, and a first instance of an optical combiner optically coupled to combine light from second ends of the first and second optical waveguides;
    providing a reference TWMZM including a vestigial phase modulator that is shorter than the phase modulator of the test TWMZM with vestigial first and second optical waveguides and a vestigial RF transmission line electrically coupled with the vestigial first and second optical waveguides, a second instance of the optical splitter optically coupled to input light to first ends of the vestigial first and second optical waveguides, and a second instance of the optical combiner optically coupled to combine light from second ends of the vestigial first and second optical waveguides;
    acquiring an electrooptic measurement of a test structure including the test TWMZM and a first instance of electrical pads connected to drive the RF transmission line of the test TWMZM;
    acquiring an electrooptic measurement of a reference structure including the reference TWMZM and a second instance of the electrical pads connected to drive the vestigial RF transmission line of the reference TWMZM; and
    determining an electrooptic characteristic of the test TWMZM by operations including removing a contribution of the first instance of electrical pads to the electrooptic measurement of the test structure by subtracting the electrooptic measurement of the reference structure from the electrooptic measurement of the test structure.

2. The method of claim 1, wherein:
    the electrooptic measurement of the test structure comprises an electrooptic S21 measurement of the test structure as a function of RF frequency; and
    the electrooptic measurement of the reference structure comprises an electrooptic S21 measurement of the reference structure as a function of RF frequency.

3. The method of claim 2, wherein the electrooptic characteristic of the test TWMZM is an electrooptic S21 bandwidth of the test TWMZM.

4. The method of claim 1, wherein the phase modulator has a length of at least 0.1 mm and the vestigial phase modulator has a length of 50 microns or less.

5. The method of claim 1, wherein one of:
    the optical splitter includes a path length difference between first and second optical paths of the optical splitter; or
    the optical combiner includes a path length difference between first and second optical paths of the optical combiner.

6. The method of claim 1, wherein the providing of the test TWMZM and the providing of the reference TWMZM comprises:
providing both the test TWMZM and the reference TWMZM disposed on a single silicon or silicon-on-insulator (SOI) wafer.

7. The method of claim 6, further comprising:
providing a photonic integrated circuit (PIC) in the single silicon or SOI wafer by performing PIC fabrication operations on the single silicon or SOI wafer to concurrently form all of the test TWMZM and the reference TWMZM and the PIC on the single silicon or SOI wafer.

8. The method of claim 1, wherein, in each of the phase modulator and the vestigial phase modulator, each optical waveguide comprises a silicon n/p junction.

9. A method for characterizing a traveling-wave Mach-Zehnder modulator (TWMZM), the method comprising:
providing a test TWMZM including a traveling-wave electrooptic phase modulator, a first instance of an optical splitter optically coupled to input light to the traveling-wave electrooptic phase modulator, and a first instance of an optical combiner optically coupled to combine light output from the traveling-wave electrooptic phase modulator;
providing a reference TWMZM including a vestigial traveling-wave electrooptic phase modulator that is shorter than the traveling-wave electrooptic phase modulator of the test TWMZM and is of length 50 microns or less, a second instance of the optical splitter optically coupled to input light to the vestigial traveling-wave electrooptic phase modulator, and a second instance of the optical combiner optically coupled to combine light output from the vestigial traveling-wave electrooptic phase modulator;
acquiring an electrooptic measurement of the test TWMZM using first electrical pads connected to electrooptically modulate light traveling through the traveling-wave electrooptic phase modulator;
acquiring an electrooptic measurement of the reference TWMZM using second electrical pads connected to electrooptically modulate light traveling through the vestigial traveling-wave electrooptic phase modulator; and
removing a contribution of the first electrical pads to the electrooptic measurement of the test TWMZM using the electrooptic measurement of the reference TWMZM.

10. The method of claim 9, wherein:
the traveling-wave electrooptic phase modulator of the test TWMZM includes first and second optical waveguides having a length of at least 0.1 mm and a radio frequency (RF) transmission line electrically coupled with the first and second optical waveguides; and
the vestigial traveling-wave electrooptic phase modulator of the reference TWMZM includes vestigial first and second optical waveguides having a length of 50 micron or less and a vestigial RF transmission line electrically coupled with the vestigial first and second optical waveguides.

11. The method of claim 10, wherein:
in the test TWMZM, each optical waveguide comprises a silicon n/p junction and the RF transmission line is electrically coupled with the silicon n/p junctions of the optical waveguides; and
in the reference TWMZM, each vestigial optical waveguide comprises a silicon n/p junction and the vestigial RF transmission line is electrically coupled with the silicon n/p junctions of the vestigial optical waveguides.

12. The method of claim 9, wherein one of:
the optical splitter includes a path length difference between first and second optical paths of the optical splitter; or
the optical combiner includes a path length difference between first and second optical paths of the optical combiner.

13. The method of claim 9, further comprising:
supporting all of the test TWMZM, the reference TWMZM, the first electrical pads, and the second electrical pads on a single wafer.

14. The method of claim 13, further comprising:
performing photonic integrated circuit (PIC) fabrication operations on the single wafer to concurrently form all of the test TWMZM and the reference TWMZM and a PIC on the single wafer.

15. The method of claim 9, further comprising:
using a network analyzer, acquiring:
an electrooptic measurement of a test structure including the test TWMZM and the first instance of the electrical pads; and
an electrooptic measurement of a reference structure including the reference TWMZM and the second instance of the electrical pads.

16. A method of characterizing a traveling-wave Mach-Zehnder modulator (TWMZM), the method comprising:
measuring electrooptic S21 of a test structure including a test TWMZM and a first instance of electrical pads which are connected to deliver a radio frequency (RF) signal to electrooptically modulate light traveling through the test TWMZM;
measuring electrooptic S21 of a reference structure including a reference TWMZM and a second instance of the electrical pads which are connected to deliver the RF signal to electrooptically modulate light traveling through the reference TWMZM, wherein a vestigial traveling-wave electrooptic phase modulator of the reference TWMZM is shorter than a traveling-wave electrooptic phase modulator of the test TWMZM; and
determining an electrooptic characteristic of the test TWMZM without a contribution to the electrooptic characteristic of the test TWMZM from the first instance of electrical pads by operations including subtracting the measured electrooptic S21 of the reference structure from the measured electrooptic S21 of the test structure.

17. The method of claim 16, wherein:
the electrooptic S21 of the test structure is measured as a function of frequency of the RF signal applied to the test TWMZM via the first instance of the electrical pads;
the electrooptic S21 of the reference structure is measured as a function of frequency of the RF signal applied to the reference TWMZM via the second instance of the electrical pads; and
the electrooptic characteristic of the test TWMZM comprises electrooptic S21 bandwidth of the test TWMZM.

18. The method of claim 16, wherein:
the test TWMZM includes a first instance of an optical splitter connected to split input light into first and second optical waveguides of the traveling-wave electrooptic phase modulator of the test TWMZM and a first instance of an optical combiner connected to combine light output by the first and second optical waveguides of the traveling-wave electrooptic phase modulator of the test TWMZM; and the reference TWMZM includes a second instance of the optical splitter connected to split input light into first and second optical waveguides of the vestigial traveling-wave electrooptic phase modulator of the reference TWMZM and a second instance of the optical combiner connected to combine light output by the first and second optical waveguides of the vestigial traveling-wave electrooptic phase modulator of the reference TWMZM.

19. The method of claim 18, wherein one of:

the optical splitter includes a path length difference between input light coupled into the first optical waveguide and the input light coupled into the second optical waveguide; or the optical combiner includes a path length difference between light coupled out of the first optical waveguide and light coupled out of the second optical waveguide.

20. The method of claim 16, wherein:

the traveling-wave electrooptic phase modulator of the test TWMZM has a length of at least 0.1 mm; and the vestigial traveling-wave electrooptic phase modulator of the reference TWMZM has a length of 50 microns or less.

* * * * *